US012607724B2

(12) United States Patent
Shin et al.

(10) Patent No.: US 12,607,724 B2
(45) Date of Patent: Apr. 21, 2026

(54) OBJECT DETECTION DEVICE AND OPERATING METHOD THEREOF

(71) Applicant: SAMSUNG ELECTRONICS CO., LTD., Suwon-si (KR)

(72) Inventors: Dongjae Shin, Seoul (KR); Hyunil Byun, Seongnam-si (KR); Kyunghyun Son, Seongnam-si (KR); Changgyun Shin, Anyang-si (KR); Tatsuhiro Otsuka, Suwon-si (KR); Jisan Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 699 days.

(21) Appl. No.: 17/721,624

(22) Filed: Apr. 15, 2022

(65) Prior Publication Data

US 2023/0063732 A1 Mar. 2, 2023

(30) Foreign Application Priority Data

Aug. 30, 2021 (KR) ........................ 10-2021-0115095

(51) Int. Cl.
*G01S 7/4865* (2020.01)
*G01S 7/486* (2020.01)
*G01S 17/26* (2020.01)

(52) U.S. Cl.
CPC .......... *G01S 7/4866* (2013.01); *G01S 7/4868* (2013.01); *G01S 17/26* (2020.01)

(58) Field of Classification Search
CPC .... G01S 7/4861; G01S 7/4865; G01S 7/4866; G01S 17/894
See application file for complete search history.

(56) References Cited

U.S. PATENT DOCUMENTS

| | | | |
|---|---|---|---|
| 6,448,923 B1 * | 9/2002 | Zrnic | G01S 13/951 |
| | | | 342/195 |
| 8,848,171 B2 | 9/2014 | Stutz et al. | |
| 10,845,479 B1 * | 11/2020 | Hodges | G01S 15/526 |
| 2002/0126270 A1 | 9/2002 | Chien et al. | |

(Continued)

FOREIGN PATENT DOCUMENTS

| | | |
|---|---|---|
| CN | 110515054 A | 11/2019 |
| DE | 102004022911 A1 | 12/2005 |

(Continued)

OTHER PUBLICATIONS

Fazli, Saeid, and Lindsay Kleeman. "A low sample rate real time advanced sonar ring." 2004 Australasian Conference on Robotics and Automation. 2004 (Year: 2004).*

(Continued)

*Primary Examiner* — Jennifer D. Carruth
(74) *Attorney, Agent, or Firm* — Sughrue Mion, PLLC

(57) ABSTRACT

An object detection device and an operating method thereof are provided. The object detection device detects light and outputs a received signal, which is an electrical signal, time-delays a part of the received signal with respect to a rest of the received signal, converts the rest of the received signal into a digital signal, converts the time-delayed part of the received signal into one or more time-delayed digital signals, and determines a distance to an object based on the digital signal and the one or more time-delayed digital signals.

14 Claims, 18 Drawing Sheets

(56) References Cited

U.S. PATENT DOCUMENTS

| | | | | |
|---|---|---|---|---|
| 2006/0013183 | A1 * | 1/2006 | Lee | H04B 7/15564 |
| | | | | 370/343 |
| 2016/0104337 | A1 * | 4/2016 | Schuler | G06T 7/246 |
| | | | | 235/462.08 |
| 2017/0219695 | A1 | 8/2017 | Hall et al. | |
| 2019/0293768 | A1 | 9/2019 | Subasingha et al. | |
| 2019/0339388 | A1 | 11/2019 | Crouch et al. | |
| 2021/0055392 | A1 | 2/2021 | Lee et al. | |
| 2021/0199808 | A1 | 7/2021 | Shin et al. | |
| 2022/0113388 | A1 * | 4/2022 | Bush | G01S 7/497 |

FOREIGN PATENT DOCUMENTS

| | | | | | |
|---|---|---|---|---|---|
| DE | 102012112985 | B3 * | 12/2013 | | G01S 17/42 |
| DE | 102016213979 | A1 | 2/2018 | | |
| EP | 2088453 | A1 * | 8/2009 | | G01S 17/10 |
| EP | 2088453 | B1 * | 4/2010 | | G01S 17/10 |
| JP | H0965115 | A * | 3/1997 | | |
| JP | 6806347 | B2 | 1/2021 | | |
| KR | 10-2020-0082366 | A | 7/2020 | | |
| KR | 10-2020-0117388 | A | 10/2020 | | |

OTHER PUBLICATIONS

Wei, et al., "A Method for Noise Removal of LiDAR Point Clouds", 2012, 2013 Third International Conference on Intelligent System Design and Engineering Applications, 4 pages total.

Lee, et al., "Single-Chip Beam Scanner with Integrated Light Source for Real-Time Light Detection and Ranging", 2020, IEEE International Electron Devices Meeting (IEDM), 4 pages total.

Communication dated Aug. 25, 2022, issued by the European Patent Office in counterpart European Application No. 22161944.8.

* cited by examiner

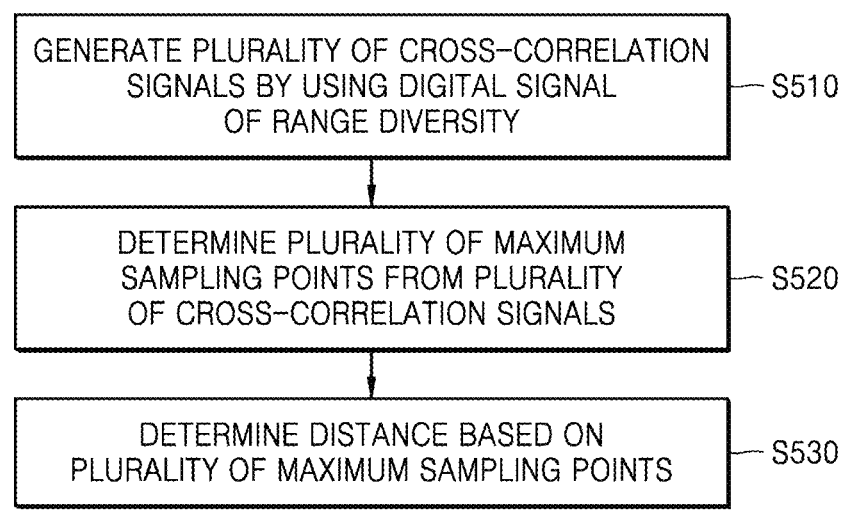

| | |
|---|---|
| GENERATE PLURALITY OF CROSS-CORRELATION SIGNALS BY USING DIGITAL SIGNAL OF RANGE DIVERSITY | S510 |
| DETERMINE PLURALITY OF MAXIMUM SAMPLING POINTS FROM PLURALITY OF CROSS-CORRELATION SIGNALS | S520 |
| DETERMINE DISTANCE BASED ON PLURALITY OF MAXIMUM SAMPLING POINTS | S530 |

FIG. 6

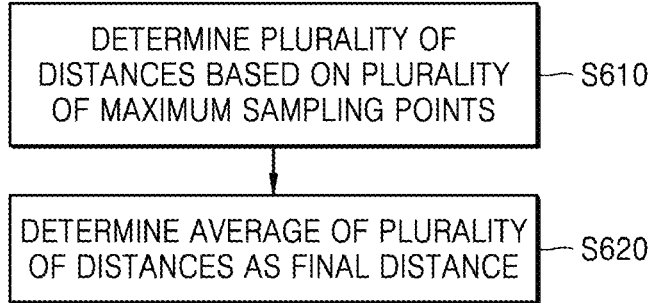

| | |
|---|---|
| DETERMINE PLURALITY OF DISTANCES BASED ON PLURALITY OF MAXIMUM SAMPLING POINTS | S610 |
| DETERMINE AVERAGE OF PLURALITY OF DISTANCES AS FINAL DISTANCE | S620 |

SELECT PLURALITY OF SAMPLING POINTS
FROM CROSS-CORRELATION SIGNAL — S1110

ESTIMATE MAXIMUM SAMPLING POINT
FROM PLURALITY OF SAMPLING POINTS — S1120

2100

2200

2300

2400

[Security]

2500

2600

OBJECT DETECTION DEVICE AND OPERATING METHOD THEREOF

CROSS-REFERENCE TO RELATED APPLICATION

This application is based on and claims priority under 35 U.S.C. § 119 to Korean Patent Application No. 10-2021-0115095, filed on Aug. 30, 2021, in the Korean Intellectual Property Office, the disclosure of which is incorporated by reference herein in its entirety.

BACKGROUND

1. Field

Apparatuses and methods consistent with example embodiments relate to an object detection device and an operating method thereof.

2. Description of the Related Art

An object detection device may measure a distance to an object by measuring a time of flight (ToF) of light to the object. More specifically, the object detection device may calculate the distance to the object by measuring a time until an optical signal emitted from a light source is reflected by the object and then returns to the object detection device, and generate a depth image of the object based on the calculated distance.

Such an object detection device may convert the optical signal into a digital signal to calculate the ToF of the light, but the ToF of the light may vary depending on a sampling rate of an analog-to-digital converter (ADC).

SUMMARY

One or more example embodiments provide an object detection device capable of improving the accuracy of a distance to an object and an operating method of the object detection device.

According to an aspect of an example embodiment, there is provided an object detection device including: a detector configured to detect light reflected from an object and output an electrical signal in an analog domain corresponding to the light, as a received signal; a converter configured to perform analog-to-digital conversion on the received signal; a splitter provided between the detector and the converter, and configured to split the received signal into a plurality of sub received signals; a plurality of signal lines provided between the splitter and the converter, and including: a non-delay line configured to send a first sub received signal from among the plurality of sub received signals to the converter; and one or more time-delay lines configured to time-delay sub received signals other than the first sub received signal, from among the plurality of sub received signals, and send the time-delayed sub received signals to the converter; and a processor configured to determine a distance to the object based on a signal output from the converter.

The converter may be further configured to convert the first sub received signal into a digital signal and convert the time-delayed sub received signals into one or more time-delayed digital signals.

The converter may include an analog-to-digital converter (ADC).

A time delay of the time-delayed sub received signals may be less than a sampling period of the converter.

When the time-delayed sub received signals are time-delayed by a same amount of time, the time-delayed sub received signals may be time-delayed with respect to the first sub received signal by ½ of a sampling period of the converter.

When the time-delayed sub received signals are time-delayed by (n−1) different times in which n is a natural number greater than 2, a time difference between neighboring time-delayed sub received signals among the time-delayed sub-received signals that are time-delayed by (n−1) different times may be equal to 1/n of a sampling period of the converter.

A sampling period of the converter may also be less than ½ of a pulse width of the received signal.

The splitter may be further configured to split the received signal into a plurality of sub received signals having a same intensity.

The number of the plurality of sub received signals may be equal to a number of the plurality of signal lines.

The processor may be further configured to generate a plurality of cross-correlation signals between each of the digital signal and the one or more time-delayed digital signals and a transmission signal corresponding to the light, determine a plurality of maximum sampling points from each of the plurality of cross-correlation signals, and determine the distance to the object based on the plurality of maximum sampling points.

The processor may be further configured to determine a plurality of estimated distances to the object based on the plurality of maximum sampling points and determine an average of the plurality of estimated distances as the distance to the object.

The processor may be further configured to determine an average sampling point from the plurality of maximum sampling points and determine the distance to the object based on the average sampling point.

The processor may be further configured to, when determining a maximum sampling point from at least one cross-correlation signal among the plurality of cross-correlation signals, select a plurality of sampling points from the at least one cross-correlation signal and apply a quadratic function to the plurality of sampling points to determine the maximum sampling point.

The number of the plurality of sampling points may be greater than or equal to 3.

The plurality of sampling points may include a first sampling point having a maximum absolute value in the at least one cross-correlation signal, a second sampling point at a time before m sampling periods from a time corresponding to the first sampling point, and a third sampling point at a time after the m sampling periods from the time corresponding to the first sampling point, in which m is a natural number greater than or equal to 1.

The processor may be further configured to generate a point cloud based on the distance to the object, and obtain a three-dimensional (3D) image regarding the object based on the generated point cloud.

According to an aspect of another example embodiment, an object detection method using an analog-to-digital converter (ADC) includes: detecting light reflected from an object and outputting an electrical signal in an analog domain corresponding to the light, as a received signal; time-delaying a part of the received signal with respect to a rest of the received signal; converting the rest of the received signal into a digital signal by the ADC; converting the time-delayed part of the received signal into one or more time-delayed digital signals by the ADC; and determining a distance to the object based on the digital signal and the one or more time-delayed digital signals.

A time delay may be less than a pulse width of the received signal.

The time-delaying may include time-delaying the part of the received signal with respect to the rest of the received signal, by ½ of a sampling period of the ADC, when the part of the received signal is time-delayed by a same amount of time.

The time-delaying may include delaying the part of the received signal such that a time difference between neighboring time-delayed received signals among received signals delayed by (n−1) different times is equal to 1/n of a sampling period of the ADC, when the part of the received signal is delayed by the (n−1) different times, in which n is a natural number greater than 2.

A sampling period of the converter may also be less than ½ of a pulse width of the received signal.

The object detection method may further include splitting the received signal into a plurality of sub received signals, in which the time-delaying includes time-delaying sub received signals other than a first sub received signal from among the plurality of sub received signals with respect to the first sub received signal.

The determining of the distance to the object may include generating a plurality of cross-correlation signals between each of the digital signal and the one or more time-delayed digital signals and a transmission signal corresponding to the light, determining a plurality of maximum sampling points from each of the plurality of cross-correlation signals, and determining the distance to the object based on the plurality of maximum sampling points.

The determining of the distance to the object may include determining a plurality of estimated distances to the object based on the plurality of maximum sampling points and determining an average of the plurality of estimated distances as the distance to the object.

The determining of the distance to the object may include determining an average sampling point from the plurality of maximum sampling points and determining the distance to the object based on the average sampling point.

The determining of the plurality of maximum sampling points may include: selecting a plurality of sampling points from at least one cross-correlation signal of the plurality of cross-correlation signals; and applying a quadratic function to the plurality of sampling points to determine the plurality of maximum sampling points.

The plurality of sampling points may include a first sampling point having a maximum magnitude in the at least one cross-correlation signal, a second sampling point at a time before m sampling periods from a time corresponding to the first sampling point, and a third sampling point at a time after the m sampling periods from the time corresponding to the first sampling point, in which m is a natural number greater than or equal to 1.

BRIEF DESCRIPTION OF THE DRAWINGS

The above and/or other aspects will be more apparent by describing certain example embodiments, with reference to the accompanying drawings, in which:

FIG. 3 is a block diagram illustrating in more detail an object detection device with increased distance accuracy, according to an example embodiment of the present disclosure;

FIG. 5 is a flowchart illustrating a method of determining a distance to an object by using a digital signal of a range diversity, according to an example embodiment of the present disclosure;

FIG. 6 is a flowchart illustrating a method of determining a distance via a plurality of maximum sampling points, according to an example embodiment of the present disclosure;

DETAILED DESCRIPTION

Figure 1:
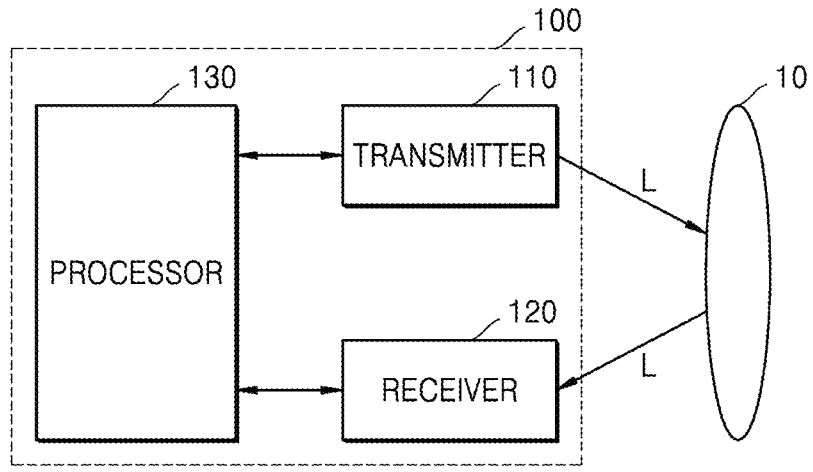
FIG. 1 is a view for describing an exemplary operation of an object detection device, according to an example embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Although terms used in the present disclosure are selected with general terms popularly used at present under the consideration of functions in the present disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the present disclosure. Thus, the terms used in the present disclosure should be defined not by the simple names of the terms but by the meaning of the terms and the contents throughout the present disclosure.

In the specification, when a region is "connected" to another region, the regions may not only be "directly connected", but may also be "electrically connected" via another device therebetween. As used herein, the singular forms are intended to include the plural forms as well, unless the context clearly indicates otherwise. When it is assumed that a certain part includes a certain component, the term "including" means that a corresponding component may further include other components unless a specific meaning opposed to the corresponding component is written.

The term such as "comprise" or "include" used in the embodiments should not be interpreted as including all of elements or operations described herein, and should be interpreted as excluding some of the elements or operations or as further including additional elements or operations.

Terms such as first, second, and the like may be used to describe various elements, but may be used only for the purpose of distinguishing one element from another element. These terms are not intended to limit that substances or structures of elements are different.

The use of "the" and other demonstratives similar thereto may correspond to both a singular form and a plural form.

The description of the following embodiments should not be construed as limiting the scope of rights, and matters easily inferred by those of ordinary skill in the art should be construed as belonging to the scope of the embodiments. Hereinafter, the embodiments for illustration will be described in detail with reference to the accompanying drawings.

FIG. 1 is a diagram for describing an exemplary operation of an object detection device 100, according to an example embodiment of the disclosure.

An object detection device 100 may be used as a sensor (e.g., a light detection and ranging (LiDAR) sensor, a radio detection and ranging (RADAR) sensor, a three-dimensional (3D) camera, a stereo camera, a depth sensor, etc.) for obtaining 3D information, such as distance information regarding an object 10, etc., in real time. The object detection device 100 may be applied to an electronic device such as an unmanned vehicle, an autonomous vehicle, a robot, a drone, a portable terminal, etc.

Referring to FIG. 1, the object detection device 100 may include a transmitter 110 that emits light L toward an object 10 according to a (electrical) transmission signal, a receiver 120 that detects the light L and outputs a (electrical) received signal based on the detected light L, and a processor 130 that controls the transmitter 110 and the receiver 120 to measure a distance to the object 10, based on a transmission time of the emitted light L and a reception time of the detected light L.

The transmitter 110 may output the light L to be used for analysis of a position, a shape, etc., of the object 10.

However, the disclosure is not limited thereto. The transmitter 110 may output a radio frequency (RF) signal, a laser signal, or a light emitting diode (LED) signal, but a type and a frequency range of a signal output from the transmitter 110 are not limited thereto. Although distance measurement using light will be described below, it is needless to say that an RF signal may be equally applied.

For example, the transmitter 110 may output light of an infrared band wavelength. When the light in an infrared band is used, mixing with natural light in a visible light zone including sunlight may be prevented. However, it is not necessarily limited to the infrared band and light of various wavelength bands may be emitted.

The transmitter 110 may include at least one light source. For example, the transmitter 110 may include a light source such as a laser diode (LD), an edge emitting laser, a vertical-cavity surface emitting laser (VCSEL), a distributed feedback laser, a light emitting diode (LED), a super luminescent diode (SLD), etc.

The transmitter 110 may generate and output light in a plurality of different wavelength bands. The transmitter 110 may generate and output pulse light or continuous light.

According to an example embodiment of the present disclosure, the transmitter 110 may further include a beam steering element for changing the radiation angle of light. For example, the beam steering element may be a scanning mirror or an optical phased array.

According to an example embodiment of the present disclosure, the transmitter 110 may emit light whose frequency or phase is modulated over time. For example, the transmitter 110 may emit light using a frequency modulated continuous-wave (FMCW) method or a phase modulation continuous wave (PMCW) method.

The receiver 120 may include at least one detector 210, and the detector 210 may identify and detect the light L reflected from the object 10. According to an example embodiment of the present disclosure, the receiver 120 may further include an optical element for collecting the received signal to the detector 210.

The transmitter 110 and the receiver 120 may be implemented as separate devices or may be implemented as a single device (e.g., a transceiver). For example, when the object detection device 100 is a radar device, a radar sensor may emit a radar signal to the outside and receive a radar signal reflected from the object 10. The radar sensor may be both the transmitter 110 and the receiver 120.

The processor 130 may control the transmitter 110 and the receiver 120 to control an overall operation of the object detection device 100. For example, the processor 130 may perform power supply control, on/off control, pulse wave (PW) or continuous wave (CW) generation control, etc., with respect to the transmitter 110.

The processor 130 may perform signal processing for obtaining information about the object 10, by using the received signal output from the receiver 120. The processor 130 may determine a distance to the object 10 based on a time of flight (ToF) of light output by the transmitter 110, and perform data processing for analyzing the position and shape of the object 10. For example, the processor 130 may generate a point cloud based on distance information about the object 10 and obtain a 3D image of the object 10 based on the point cloud.

The 3D image obtained by the processor 130 may be transmitted to another unit and utilized. For example, such information may be transmitted to the processor 130 of an autonomous driving device, such as an unmanned vehicle, a drone, etc., in which the object detection device 100 is employed. In addition, such information may be utilized by smartphones, cell phones, personal digital assistants (PDAs), laptops, personal computers (PCs), wearable devices, and other mobile or non-mobile computing devices.

Meanwhile, the object detection device 100 of the present disclosure may further include other general-purpose components in addition to the components of FIG. 1.

For example, the object detection device 100 may further include a memory that stores various data. The memory may store data processed or to be processed in the object detection device 100. Also, the memory may store applications, drivers, etc., to be driven by the object detection device 100.

The memory may include random access memory (RAM) such as dynamic random-access memory (DRAM), static random-access memory (SRAM), etc., read-only memory (ROM), electrically erasable programmable read-only memory (EEPROM), compact disk (CD)-ROM, Blu-ray or other optical disk storages, hard disk drive (HDD), solid state drive (SSD), or flash memory, and may also include other external storage devices that are accessible by the object detection device 100.

The object detection device 100 may be implemented with a housing or may be implemented as a plurality of housings. When the object detection device 100 is implemented with a plurality of housings, a plurality of components may be connected wiredly or wirelessly. For example, the object detection device 100 may be divided into a first device including the transmitter 110 and the receiver 120 and a second device including the processor 130. The object detection device 100 may also be implemented as a part of a device that performs other functions, for example, an autonomous driving device.

Figure 2:
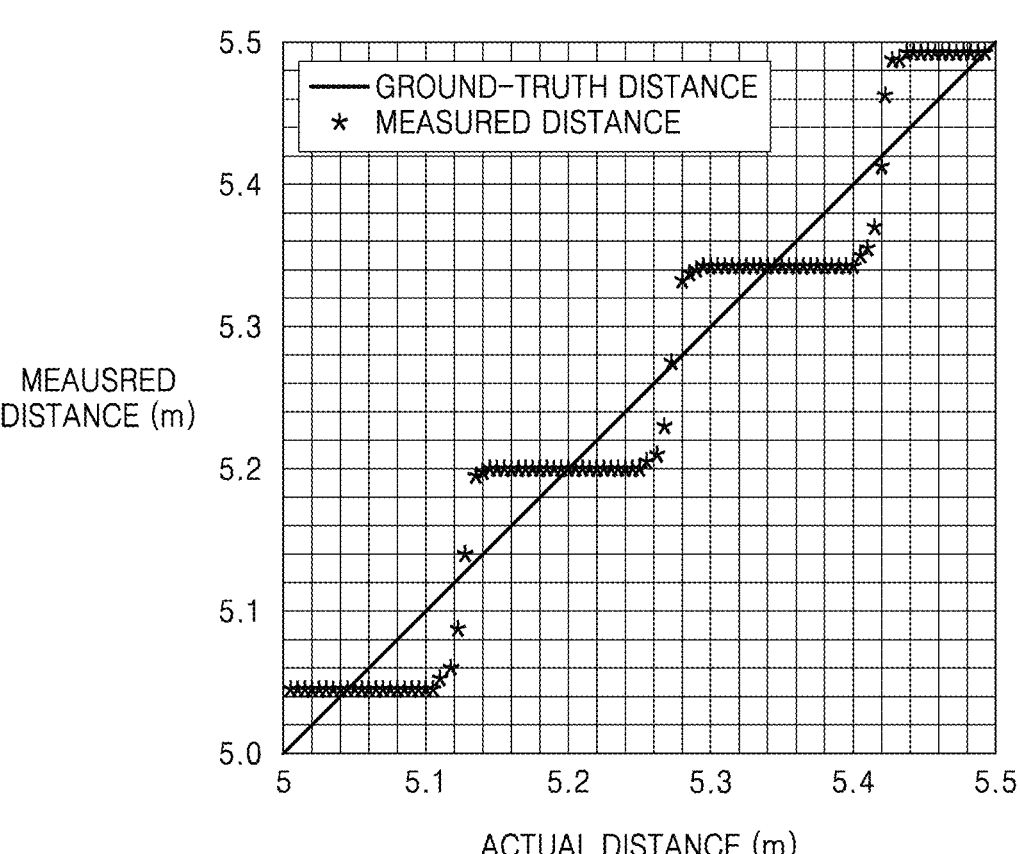
FIG. 2 is a graph showing a relationship between an actual distance and a distance measurement result in an analog-to-digital converter (ADC)-based object detection device.

FIG. 2 is a graph showing a relationship between an actual distance and a distance measurement result in an analog-to-digital converter (ADC)-based object detection device. An X-axis represents an actual distance to an object, and a Y-axis represents a result of measuring the distance to the object using an ADC.

Since the ADC quantizes a received signal at a specific sampling rate, the accuracy of the distance to the object may depend on the sampling rate of the ADC. That is, a measurement result may change in a stepwise manner according to the sampling rate of the ADC. Thus, the measured distance may be the same even though the actual distance to the object is different. Also, even when an object exists at the same distance as a specific distance, for example, about 5.12 m or 5.26 m, the measurement result may vary greatly depending on a digital conversion time of the received signal.

For example, when the sampling rate is 1 GS/s, a sampling period is 1 ns, such that within a distance of 15 cm that light travels within 1 sampling period, the same measurement value is obtained, and thus a distance error may be repeated in a stepwise manner up to ±7.5 cm. Therefore, the easiest way to increase distance accuracy is to increase the sampling rate of the ADC. However, this may increase the cost of the ADC.

Figure 3:
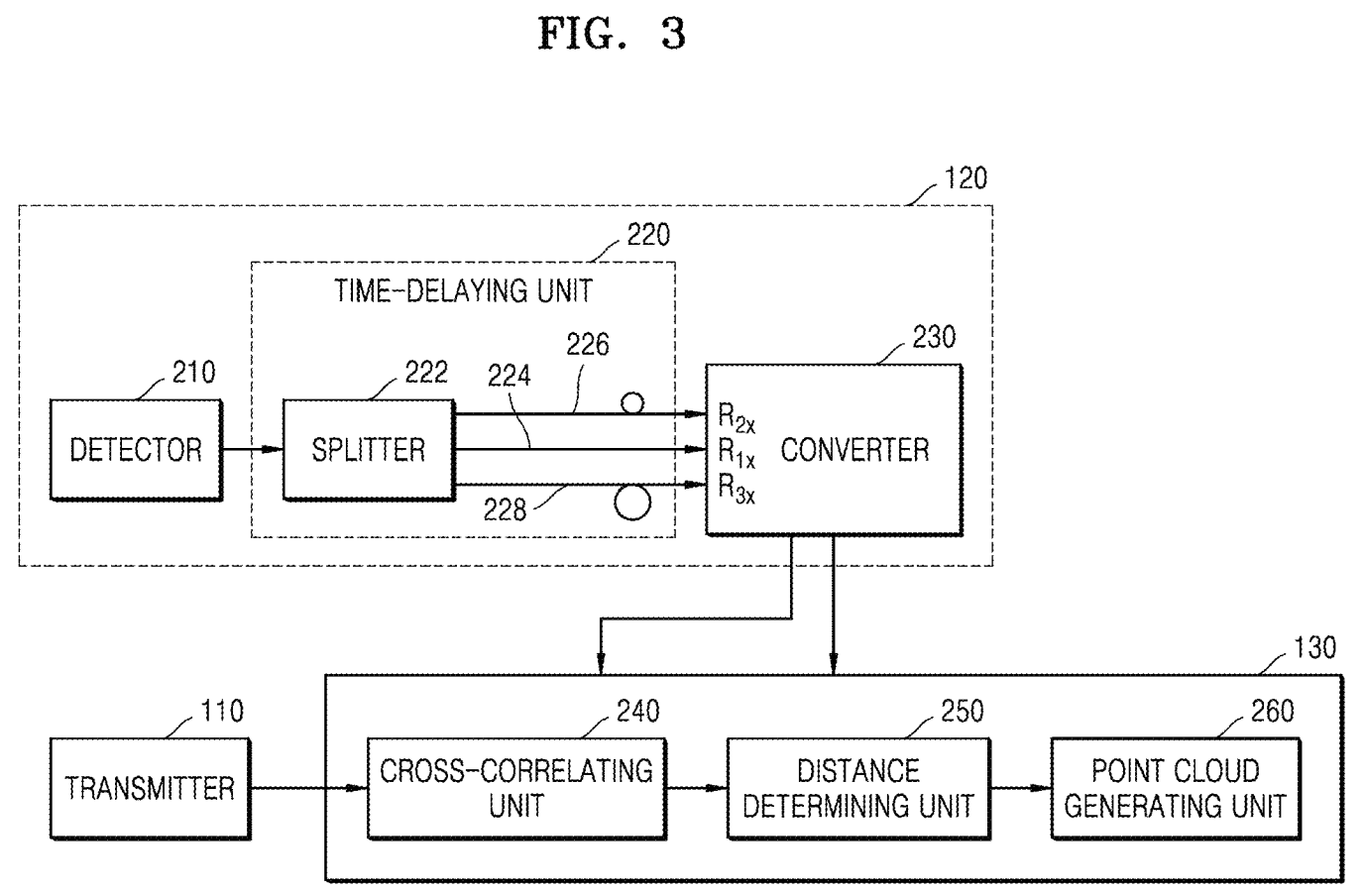

The object detection device 100 according to an example embodiment of the present disclosure may increase the accuracy of the distance to the object even in a case in which a converter 230 is implemented to have a low sampling rate. FIG. 3 is a block diagram illustrating in more detail an object detection device with increased distance accuracy, according to an example embodiment of the present disclosure, and FIG. 4 is a flowchart illustrating a method of measuring a distance to an object, according to an example embodiment of the present disclosure.

Figure 4:
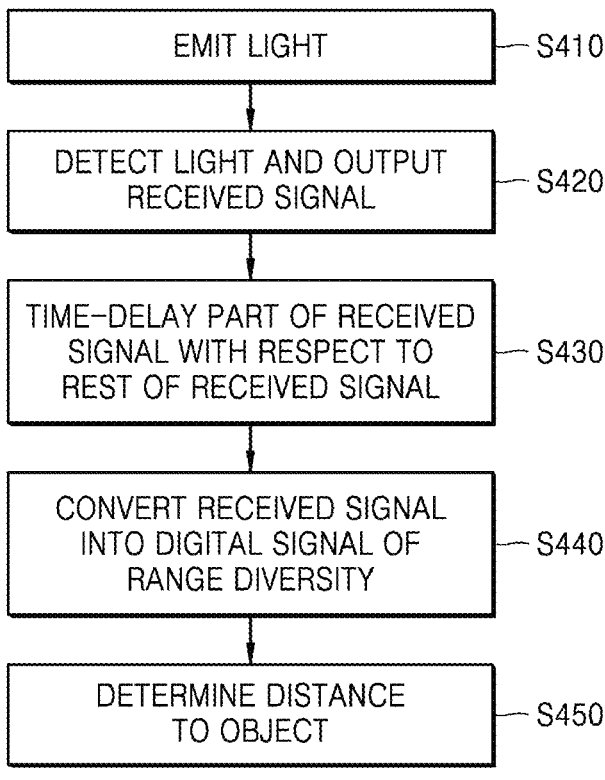
FIG. 4 is a flowchart illustrating a method of measuring a distance to an object, according to an example embodiment of the present disclosure.

Referring to FIGS. 3 and 4, the transmitter 110 may emit light toward the object 10 based on a transmission signal, in operation S410. More specifically, the transmitter 110 may generate the transmission signal under the control of the processor 130 and emit light according to the transmission signal. The transmission signal and the light may be of a pulse type. A part of the transmission signal of the transmitter 110 may be output to the processor 130. The part of the transmission signal may be used to calculate the ToF of light. The transmitter 110 of FIG. 3 may correspond to the transmitter 110 of FIG. 1.

The receiver 120 may include a detector 210 that detects light and outputs a received signal, a time-delaying unit 220 that time-delays a part of the received signal with respect to the rest of the received signal, and the converter 230 that converts the received signal in an analog domain into a digital signal. The converter 230 may be also referred to as an analog-to-digital converter.

The detector 210 of the receiver 120 may detect the light and output a received signal corresponding to the light in operation S420. The light may include light reflected from the object 10. The reflected light may be of the pulse type, such that the received signal corresponding to the light may also be of the pulse type. The detector 210 may be an optical sensor or an RF sensor.

The detector 210, which is a sensor capable of sensing light, may be, for example, a light-receiving element that generates an electrical signal by light energy. For example, the detector 210 may include an avalanche photo diode (APD) or a single photon avalanche diode (SPAD). The type of the light-receiving element may not be particularly limited.

The time-delaying unit 220 may time-delay a part of the received signal with respect to the rest of the received signal in operation S430. The time-delaying unit 220 may include a splitter (e.g., an optical splitter, a planar light wave circuit (PLC) splitter, a fiber optic splitter (FBT) splitter, etc.) 222 that splits the received signal into a plurality of sub received signals, a signal line 224 that applies a first sub received signal among the plurality of sub received signals to the converter 230, and one or more time-delay lines 226 and 228 that time-delay the time-delayed sub received than the first sub received signal among the plurality of sub received signals from the first sub received signal.

The time-delay may be smaller than a pulse width of the received signal. Generally, a pulse width of a transmission signal, a pulse width of the light, and the pulse width of the received signal may be the same as one another. This is because light is emitted by the transmission signal and the received signal corresponds to the light reflected from the object out of the above-mentioned light. Noise may be generated in a process of transmitting light and a signal, but this may correspond to an error range. Hereinafter, for convenience, the pulse width may refer to the pulse width of the received signal.

Moreover, the time-delay may vary depending on the number of time-delay lines 226 and 228. When a part of the received signal is time-delayed by one type (e.g., by the same amount of time), that is, when there is one time-delay line, a part of the received signal may be delayed by ½ of the sampling period of the converter 230 than the rest of the received signal. Alternatively, when a part of the received signal is delayed by n−1 different times (n is a natural number greater than or equal to 3), that is, when there are (n−1) time-delay lines, a time difference between neighboring time-delayed received signals among received signals delayed by (n−1) different times may be 1/n of the sampling period of the converter 230.

For example, the time-delaying unit 220 may include a splitter 222 that splits the received signal into first through third sub received signals, a signal line 224 that sends the first sub received signal output from the splitter 222 to the converter 230, a first time-delay line 226 that first time-delays the second sub received signal, output from the splitter 222, and applies the delayed second sub received signal to the converter 230, and a second time-delay line 228 that second time-delays the third sub received signal, output from the splitter 222, by a second time and applies the delayed third sub received signal to the converter 230. Herein, the first time-delaying may mean time-delaying by ⅓ of a pulse width, and the second time-delaying may mean time-delaying by ⅔ of the pulse width.

While one signal line 224 and two time-delay lines 226 and 228 are shown in FIG. 3, the present disclosure is not limited thereto. There may be one time-delay line or three or more time-delay lines, as the time-delay lines 226 and 228. The object detection device 100 may be designed differently according to an application field thereof. For example, the object detection device 100 is applied to an autonomous vehicle for use in detection of a long-distance object, a time-delay line may be small. Meanwhile, when the object detection device 100 is used to detect a short-range object such as in face recognition, the more the time-delay lines are, the higher the accuracy of a 3D image is.

The converter 230 may convert the received signal into a digital signal of range diversity according to a preset sampling rate, in operation S440. The converter 230 may include an ADC. For example, the sampling rate may be set in a range of 100 Hz to 10 GHz. The converter 230 may convert a part of the time-delayed received signal into one or more time-delayed digital signals, and convert the rest of the received signal into a digital signal. Herein, the digital signal and the one or more time-delayed digital signals may be referred to as a digital signal of range diversity.

For example, as shown in FIG. 3, the converter 230 may convert the first sub received signal input through the signal line 224 into a digital signal, convert the second sub received signal input through the first time-delay line 226 into a first time-delayed digital signal, and convert the third sub received signal input through the second time-delay line 228 into a second time-delayed digital signal.

The converter 230 may output each of the digital signal and the first and second time-delayed digital signals as vector data in the form of a column vector or a row vector. The vector data may mean an array in the form of a column vector or a row vector including a set of elements. A quantized value of the received signal may be stored in each element. The converter 230 may be an ADC that converts an analog-type received signal into a digital type.

Alternatively, the transmitter 110 and the receiver 120 may further include a high-pass filter that removes an offset from the transmission signal and the received signal, and an amplifier (AMP) that amplifies the magnitudes of the transmission signal and the received signal.

The transmitting unit 110 may further include an ADC that converts the transmission signal in an analog domain into a digital signal. In another example, the converter 230 may be provided outside the receiver 120, and may be configured to receive analog signals that are output from both the transmitter 1120 and the receiver 120, and convert the analog signals to digital signals.

The processor 130 may determine the distance to the object 10 based on the digital signal of range diversity, in operation S450.

The processor 130 may determine the distance to the object by using a cross-correlation signal between the digital signal of range diversity, that is, a digitized received signal, and the transmitted signal.

The cross-correlation signal is a result of quantitatively calculating a similarity between the received signal and the transmission signal, such that the transmission signal may have the most similar shape as the received signal when the transmission signal has a time-delay equal to a ToF of light. Thus, when the time equal to the ToF is delayed, the cross-correlation signal may have a maximum value, and a time when the cross-correlation signal has the maximum value may be a basis for the ToF of light.

FIG. 5 is a flowchart illustrating a method of determining a distance to an object by using a digital signal of a range diversity, according to an example embodiment of the present disclosure.

Referring to FIGS. 3 and 5, the processor 130 may include a cross-correlating unit 240 that generates a cross-correlation signal between the digital signal of range diversity and the transmission signal, a distance determining unit 250 that determines a distance to the object 10 from the cross-correlation signal, and a point cloud generating unit 260 that generates a point cloud based on distance information.

The cross-correlating unit 240 may generate a plurality of cross-correlation signals between each of the digital signal and the one or more time-delayed digital signals and the transmission signal, in operation S510. To this end, the cross-correlating unit 240 may further include a correlator.

The cross-correlating unit 240 may receive a quantized (i.e., digitized) transmission signal xk from the transmitter 110 and a quantized (i.e., digitized) received signal (yi+k) from the receiver 120, and generate a cross-correlation signal Rxyi between the transmission signal and the received signal, as in Equation 1 below.

$$R_{xyi} = \sum_{k=0}^{N-1} x_k y_{i+k}, \, i = -(N-1), -(N-2), \qquad \text{[Equation 1]}$$

$$\dots, -1, 0, 1, \dots, (N-2), (N-1)$$

Herein, the quantized received signal (yi+k) may be a digital signal or one or more time-delayed digital signals.

For example, the cross-correlating unit 240 may generate a first cross-correlation signal between a digital signal as the received signal and a digitized transmission signal, generate a second cross-correlation signal between the first time-delayed digital signal and the digitized transmission signal, and a third cross-correlation signal between the second time-delayed digital signal and the digitized transmission signal.

The distance determining unit 250 may determine a plurality of maximum sampling points from the plurality of cross-correlation signals, in operation S520. The sampling point may be an element of the cross-correlation signal, and each sampling point may include time information and intensity information. That is, the cross-correlation signal is formed by the digitized received signal and the digitized transmission signal, such that the cross-correlation signal may be a combination of sampling points. A period of the sampling point may be the same as the sampling period of the converter 230.

In performing operation S520, the distance determining unit 250 may determine a first maximum sampling point from sampling points included in the first cross-correlation signal, determine a second maximum sampling point from sampling points included in the second cross-correlation signal, and determine a third maximum sampling point from sampling points included in the third cross-correlation signal. The distance determining unit 250 may select a maximum sampling point from among sampling points included in the cross-correlation signal, and estimate the maximum sampling point by using the sampling points included in the cross-correlation signal. A method of estimating a maximum sampling point will be described later.

The distance determining unit 250 may determine the distance to the object based on the plurality of maximum sampling points, in operation S530.

FIG. 6 is a flowchart illustrating a method of determining a distance via a plurality of maximum sampling points, according to an example embodiment of the present disclosure.

The distance determining unit 250 may determine a plurality of distances to an object based on a plurality of maximum sampling points, in operation S610. For example, the distance determining unit 250 may determine a first distance to the object based on the first maximum sampling point, determine a second distance to the object based on the second maximum sampling point, and determine a third distance to the object based on the third maximum sampling point. The distance determining unit 250 may determine the distance to the object from a ToF of light that may be calculated using a sampling rate S of the converter 230 and a time value imax of each maximum sampling point. For example, the distance determining unit 250 may determine 2 imax/S as a ToF of light and determine 2cimax/S as the distance to the object 10 (c is the speed of light).

The distance determining unit 250 may determine an average of the plurality of distances as a final distance to the object, in operation S620.

In another example embodiment of the present disclosure, when signal values indicating a received signal or a transmission signal include negative values due to noise, oscillation, etc., an amplification effect based on calculation of a cross-correlation function may be reduced. The processor 130 may convert each of the received signal and the transmission signal into a unipolar signal to prevent the amplification effect based on calculation of the cross-correlation function from being reduced due to noise, oscillation, etc. The unipolar signal, which is the opposite of a bipolar signal, may mean a signal having signal values of either a negative polarity or a positive polarity.

The processor 130 may convert the received signal into a unipolar transmission signal and a unipolar received signal by taking absolute values of at least some of the transmission signal and the received signal. Alternatively, the processor 130 may convert the received signal and the transmission signal into a unipolar signal using a method other than the method of taking the absolute value. For example, the processor 130 may convert the received signal and the transmission signal into a unipolar signal by using a scheme to replace signal values less than a specific value (greater than or equal to 0) out of signal values indicating the received signal or the transmission signal with the specific value, and convert the received signal and the transmission signal into a unipolar signal by using a method of squaring the signal values indicating the received signal or the transmission signal.

The processor 130 may generate a plurality of cross-correlation signals between a unipolar received signal, i.e., a unipolar digital signal of range diversity and a unipolar digitized transmission signal, determine a sampling point having a maximum magnitude from each of the plurality of cross-correlation signals, determine a plurality of distances to an object by using each sampling point, and determine a final distance by averaging the plurality of distances.

As described above, when the distance to the object is determined using the digital signal of range diversity, a distance error to the object may be reduced.

Figure 7:
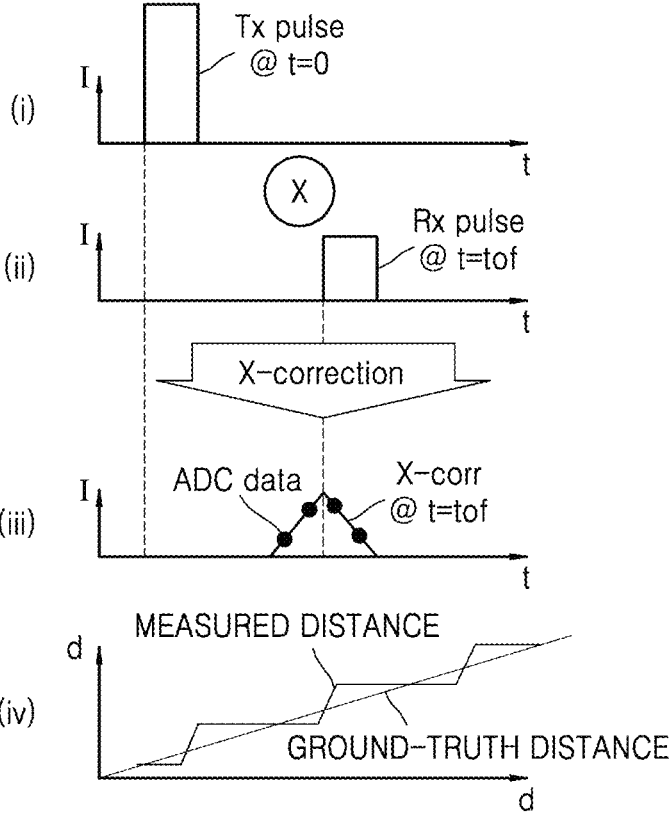
FIG. 7 is a reference diagram showing a result of measuring a distance by using a received signal having no range diversity, as a comparative example.

FIG. 7 is a reference diagram showing a result of measuring a distance by using a received signal having no range diversity, as a comparative example. (i) of FIG. 7 shows a transmission signal output from the transmitter 110, and (ii) of FIG. 7 shows a received signal output from the detector 210. The transmission signal and the received signal may be of a pulse type. The transmitter 110 may output light according to the transmission signal, and a part of the light may be reflected by the object and detected by the detector 210. The detector 210 may output a received signal corresponding to the detected light. Generally, the received signal corresponds to a part of light, such that the magnitude of the received signal may be smaller than that of the transmission signal. To facilitate distance measurement, the receiver 120 may further include an amplifier for amplifying the received signal.

The received signal may be converted into a digital signal by the converter 230, and the cross-correlating unit 240 may generate a cross-correlation signal between the transmission signal and the digital signal. (iii) of FIG. 7 shows a cross-correlation signal between the transmission signal and the digital signal. (iv) of FIG. 7 shows the distance to the object, measured from the cross-correlation signal. In (iv) of FIG. 7, the x axis indicates an actual distance of the object and the y axis indicates the distance measured by the object detection device 100. The measured distance may be proportional to the actual distance in a stepwise fashion because the received signal and the transmission signal are quantized, i.e., digitized.

Figure 8:
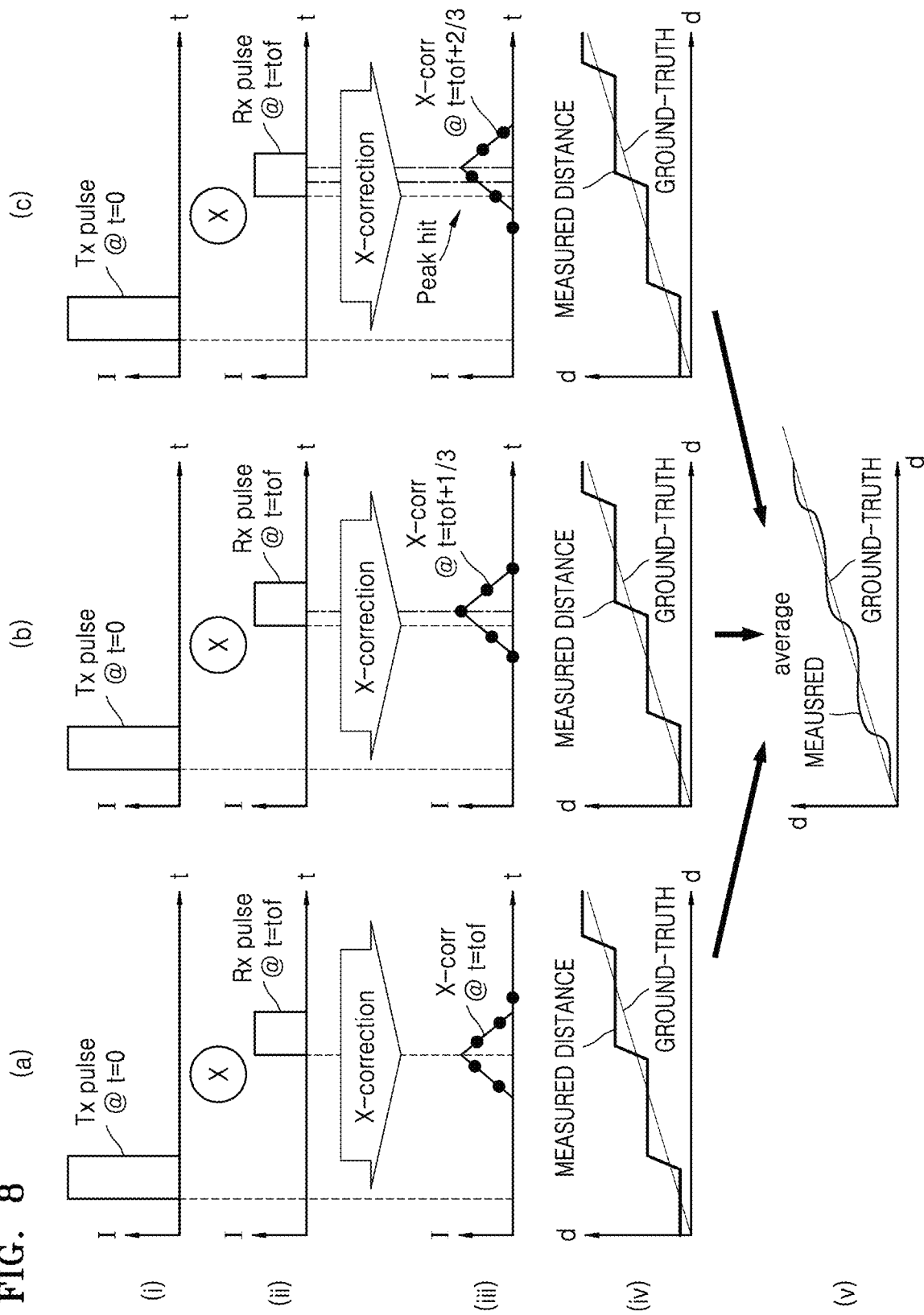
FIG. 8 is a reference diagram showing a method of measuring a distance by using a received signal of a range diversity, according to an example embodiment of the present disclosure.

FIG. 8 is a reference diagram showing a method of measuring a distance by using a received signal of a range diversity, according to an example embodiment of the present disclosure. (i) of FIG. 8 shows a transmission signal output from the transmitter 110, and (ii) of FIG. 8 shows a plurality of sub received signals output from the splitter 222. For example, (ii)(a) of FIG. 8 shows a first sub received signal applied to the converter 230 through the signal line 224 out of the received signal, (ii)(b) of FIG. 8 shows a second sub received signal applied to the converter 230 after being delayed by a first time through the first time-delay line 226 out of the received signal, and (ii)(c) of FIG. 8 shows a third sub received signal applied to the converter 230 after being delayed by a second time through the second time-delay line 228 out of the received signal.

(iii) of FIG. 8 shows cross-correlation signals among the transmission signal and the plurality of sub received signals. For example, (iii)(a) of FIG. 8 shows a first cross-correlation signal based on the first sub received signal, (iii)(b) of FIG. 8 shows a second cross-correlation signal based on the second sub received signal, and (iii)(c) of FIG. 8 shows a third cross-correlation signal based on the third sub received signal.

(iv) of FIG. 8 shows distance information regarding the object, obtained from each cross-correlation signal. In (iv) of FIG. 8, the x axis indicates the actual distance of the object and the y axis indicates the distance measured by the object detection device 100. For example, (iv)(a) of FIG. 8 shows a distance based on the first cross-correlation signal, (iv)(b) of FIG. 8 shows a distance based on the second cross-correlation signal, and (iv)(c) of FIG. 8 shows a distance based on the third cross-correlation signal. A distance measured from each of the first through third cross-correlation signals may be changed in a stepwise fashion similarly with a comparative example.

(v) of FIG. 8 shows a distance to an object based on the first through third cross-correlation signals. The distance determining unit 250 may determine a plurality of distances to the first through third cross-correlation signals, respectively, and determine final distance information by averaging a plurality of pieces of distance information. A final distance may be expected to have a significantly reduced error range when compared to the distance information based on each of the first to third cross-correlation signals.

While it is described in FIG. 6 that a plurality of distances are determined based on a plurality of maximum sampling points and an average of the plurality of distances is determined as a final distance, the present disclosure is not limited thereto.

Figure 9:
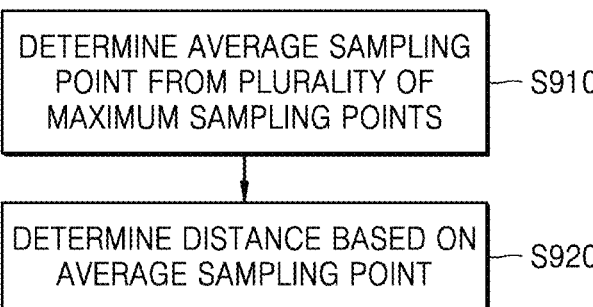
FIG. 9 is a flowchart illustrating a method of determining a distance to an object, according to another example embodiment of the present disclosure.

FIG. 9 is a flowchart illustrating a method of determining a distance to an object, according to another example embodiment of the present disclosure.

The distance determining unit 250 may determine an average sampling point from a plurality of maximum sampling points, in operation S910. For example, the distance determining unit 250 may determine the first maximum sampling point from the first cross-correlation signal, determine the second maximum sampling point from the second cross-correlation signal, and determine the third maximum sampling point from the third cross-correlation signal. The distance determining unit 250 may determine an average of the first through third maximum sampling points as the average sampling point.

The distance determining unit 250 may determine the distance to the object based on the average sampling point, in operation S920. Determination of the distance to the object may be made based on the ToF of the light as described above. That is, the distance to the object may be determined using the speed of a ball, the sampling rate, and the time of the sampling point.

The processor 130 may further include the point cloud generating unit 260 that generates a point cloud based on distance about the object. The point cloud generating unit 260 may obtain a 3D image of the object 10 based on the point cloud.

Figure 10:
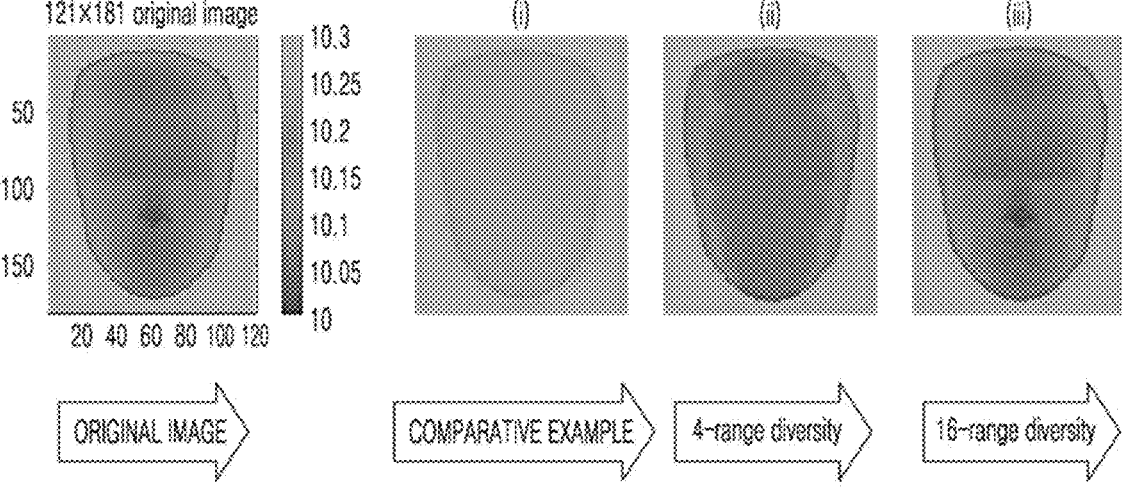
FIG. 10 shows a result of simulating a three-dimensional (3D) image based on a digital signal of a range diversity, according to an example embodiment of the present disclosure.

FIG. 10 shows a result of simulating a 3D image based on a digital signal of a range diversity, according to an example embodiment of the present disclosure. (a) of FIG. 10 shows a 3D image of a human face in which a facial shape corresponding to the 3D image of the human face is arranged at a distance of 10 m from the receiver 120 and then simulated.

(b) of FIG. 10 shows a result of simulating a digital signal without range diversity. There is no large depth difference in the contour of the face, such that a result measured with a digital signal without range diversity is almost like a two-dimensional (2D) image. (b) of FIG. 10 shows a result of simulation with a digital signal with 4 range diversities. Here, the 4-range diversity digital signal may mean a result of splitting the received signal into 4 sub received signals, digitally converting 1 sub received signal without a time-delay, and digitally converting 3 sub received signals after respectively delaying the 3 sub received signals by ¼, ²⁄₄, and ¾ times of the sampling period.

(c) of FIG. 10 shows a result of simulation with a digital signal with 16 range diversities. The 16-range diversity digital signal may mean a result of splitting the received signal into 16 sub received signals, digitally converting 1 sub received signal without a time-delay, and digitally converting 15 sub received signals after respectively delaying the 15 sub received signals such that a time difference between neighboring sub received signals is ¹⁄₁₆ of the sampling period of the converter 230.

As shown of FIG. 10, it may be seen that the higher the range diversity of the digital signal is, the clearer the 3D image is. It may be seen that by classifying the received signal into the plurality of sub received signals with different time-delays and digitally converting the same before converting the received signal into the digital signal, a distance resolution, i.e., the accuracy of the distance may be increased.

When the distance determining unit 250 determines a maximum sampling point from each of the plurality of cross-correlation signals, A sampling point with the maximum magnitude among sampling points in the cross-correlation signal may be determined as a maximum sampling point, and the maximum sampling point may be estimated using the sampling point in the cross-correlation signal.

The cross-correlation signal is generated using the digitized transmission signal and the digital signal of range diversity, and thus may also be the digitized signal. Thus, the sampling points included in the digitized cross-correlation signal may not correspond to the actual distance of the object. Thus, the distance determining unit 250 may estimate the maximum sampling point approximate to the actual distance of the object. Maximum sampling may be estimated from one cross-correlation signal. In an example embodiment of the present disclosure, the plurality of cross-correlation signals are generated, such that the distance determining unit 250 may apply maximum sampling estimation in at least one cross-correlation signal among the plurality of cross-correlation signals.

Figure 11:
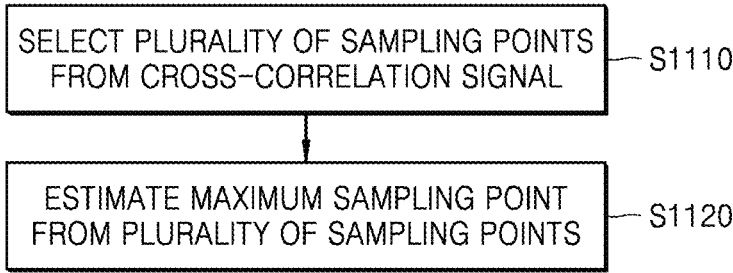
FIG. 11 is a flowchart illustrating a method, performed by a distance determining unit, of estimating a maximum sampling point, according to an example embodiment of the present disclosure.
Figure 12:
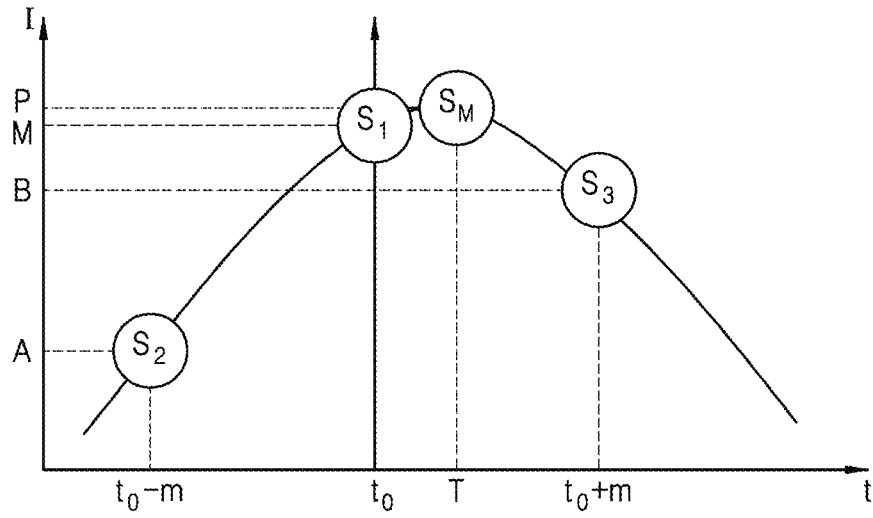
FIG. 12 is a reference diagram for describing a method of estimating a maximum sampling point in a cross-correlation signal.

FIG. 11 is a flowchart illustrating a method, performed by the distance determining unit 250, of estimating a maximum sampling point, according to an example embodiment of the present disclosure, and FIG. 12 is a reference diagram for describing a method of estimating a maximum sampling point in a cross-correlation signal.

The distance determining unit 250 may select a plurality of sampling points from the cross-correlation signal, in operation S1110. Each of the sampling points may include time and intensity information.

For example, the distance determining unit 250 may select three sampling points. The distance determining unit 250 may select three sampling points having different sampling point times in which the intensities of the three sampling points may be equal. Generally, the cross-correlation signal is in the form of a 2D function as shown in FIG. 11, such that the distance determining unit 250 may select three sampling points. However, the present disclosure is not limited thereto. According to a type of the cross-correlation signal, four or more sampling points may be selected.

The distance determining unit 250 may, among the sampling points of the cross-correlation signal, select a sampling point having the maximum absolute value as a first sampling point $S_1$, select a sampling point at a time $(t_0-m)$ before m sampling periods (m is a natural number greater than or equal to 1) from a time to corresponding to the first sampling point $S_1$, as a second sampling point $S_2$, and select a sampling point at a time $(t_0+m)$ after the m sampling periods (m is a natural number greater than or equal to 1) from the time to corresponding to the first sampling point $S_1$, as a third sampling point $S_3$. Here, the sampling point having the maximum intensity among the sampling points is selected as the first sampling point $S_1$, but the present disclosure is not limited thereto. The distance determining unit 250 may select three sampling points with different times.

The distance determining unit 250 may estimate a maximum sampling point $S_M$ based on the plurality of sampling points. For example, the distance determining unit 250 may apply a quadric function as shown in Equation 2 below to the first to third sampling points $S_1$, $S_2$, and $S_3$.

$$y = u(t-T)^2 + P \qquad \text{[Equation 2]}$$

Here, y indicates an intensity, u indicates a constant, t indicates a time, T indicates a time of the maximum sampling point $S_M$, and P indicates the intensity of the maximum sampling point $S_M$.

The distance determining unit 250 may estimate the maximum sampling point $S_M$ having a time T and an intensity P as in Equation 3 below.

$$T = \text{to} + \frac{(A-B)m}{4\left(\frac{A+B}{2} - M\right)} \qquad \text{[Equation 3]}$$

$$P = M - \left(\frac{A-B}{4}\right)^2 \frac{1}{\left(\frac{A+B}{2} - M\right)}$$

Here, to indicate a time of the first sampling point $S_1$, M indicates an intensity of the first sampling point $S_1$, A indicates an intensity of the second sampling point $S_2$, and B indicates an intensity of the third sampling point $S_3$.

The distance determining unit 250 may obtain the distance to the object based on the estimated maximum sampling point $S_M$. For example, the distance determining unit 250 may calculate the ToF of light by using the sampling rate S of the converter 230 and a time imax corresponding to the maximum sampling point. For example, the distance determining unit 250 may determine 2 imax/S as a ToF of light and determine 2cimax/S as the distance to the object 10 (c is the speed of light).

Figure 13:
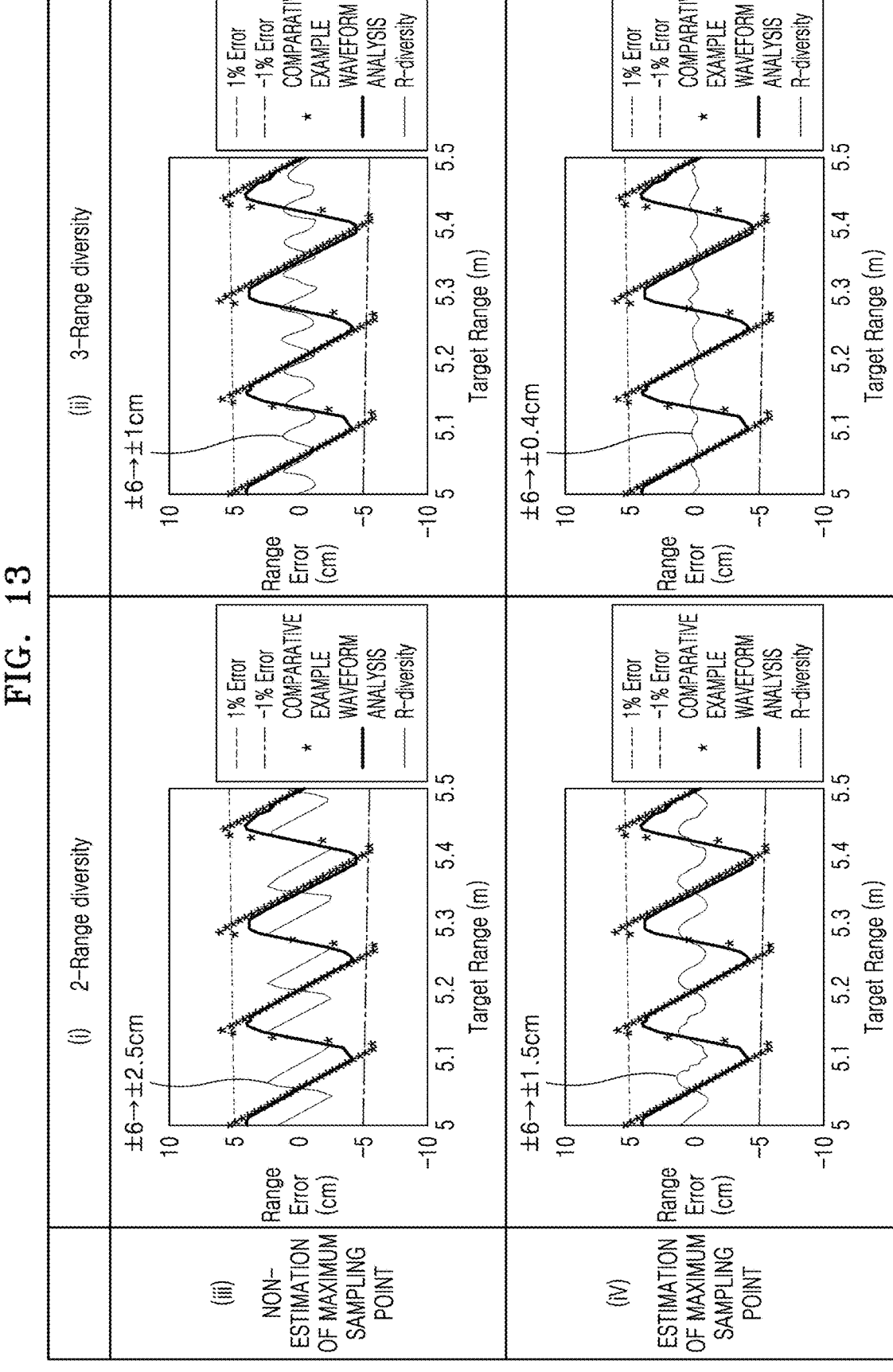
FIG. 13 is a diagram showing a range diversity and an error when an object is detected by estimating a maximum sampling point, according to an example embodiment of the present disclosure.

FIG. 13 is a diagram showing a range diversity and an error when an object is detected by estimating a maximum sampling point, according to an example embodiment of the present disclosure. The pulse width of the received signal may be 30 ns, and the sampling rate of the received signal may be 1 GHz. (i) of FIG. 13 shows a result in which the transmission signal is quantized with 2 range diversities, but a maximum sampling point is not estimated, and (ii) of FIG. 13 shows a result in which the transmission signal is quantized with 3 range diversities, but a maximum sampling point is not estimated. (iii) of FIG. 13 shows a result in which the transmission signal is quantized with 2 range diversities and a maximum sampling point is estimated, and (iv) of FIG. 13 shows a result in which the transmission signal is quantized with 3 range diversities, but a maximum sampling point is estimated. As shown in the drawings, an error range is about ±6 cm when the transmission signal is quantized without range diversity and the distance to the object is measured using the maximum sampling point of the cross-correlation signal, but as a result of application of 2 range diversities, the error range is reduced to about ±2.5 cm. As the number of range diversities is increased to 3, the error range is significantly reduced to about ±1 cm. In addition, it may be seen that the error range is further reduced when the maximum sampling point is estimated, in comparison to when only range diversity is applied.

Figure 14:
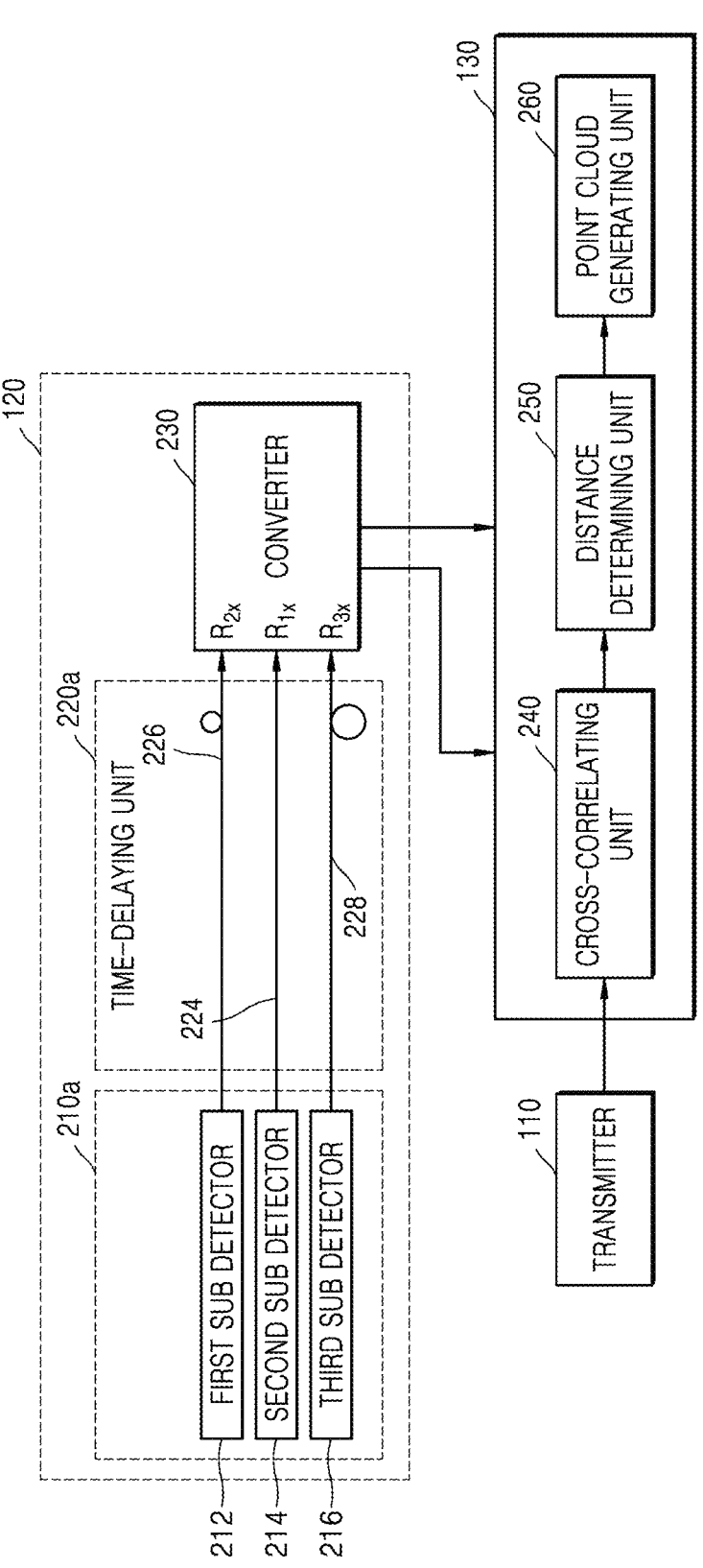
FIG. 14 is a block diagram of an object detection device, according to another example embodiment of the present disclosure.

FIG. 14 illustrates (is a block diagram of an object detection device, according to another example embodiment of the present disclosure. Comparing FIG. 3 with FIG. 14, the detector 210 of the object detection device 100 of FIG. 14 may include a plurality of sub detectors 210a. For example, the detector 210a may include first through third sub detectors 212, 214, and 216. Each of the first through third sub detectors 212, 214, and 216 may detect light reflected from the object and output a received signal. The transmitter 110 emits light corresponding to the transmission signal, and each received signal corresponds to a part of light reflected from the object and includes the same distance information with respect to the object.

The time-delaying unit 220 may include the signal line 224 that applies the first sub received signal output from one sub detector 210 among the plurality of sub detectors 210a, and the one or more time-delay lines 226 and 228 that time-delay the time-delayed sub received signals than the first sub received signal among the plurality of sub received signals with respect to the first sub received signal. The object detection device 100 of FIG. 14 may be different from that of FIG. 3 in that the object detection device 100 does not include a splitter for splitting the received signal and each sub detector 210 outputs the sub received signal. Noise may be added as the received signal is split by a splitter. The object detection device 100 of FIG. 14 may prevent noise addition by the splitter.

So far, it has been described that the received signal is converted into a digital signal having range diversity, but the present disclosure is not limited thereto. When the received signal is simply converted into the digital signal and the plurality of sampling points included in the cross-correlation signal are selected, the maximum sampling point may be estimated based on the plurality of sampling points and the distance to the object may be obtained using a time of a sampling point having the intensity of the maximum sampling point.

Figure 15:
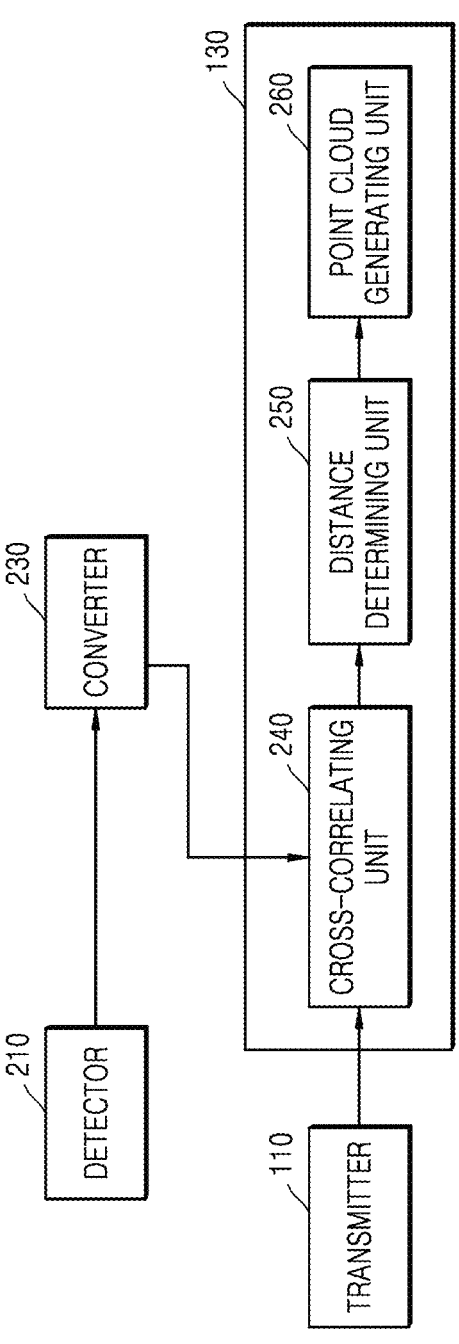
FIG. 15 illustrates is a block diagram of an object detection device without a time-delaying unit, according to another example embodiment of the present disclosure.

FIG. 15 illustrates (is a block diagram of an object detection device without a time-delaying unit, according to another example embodiment of the present disclosure. As shown in FIG. 15, the object detection device may not include a time-delaying unit. When the received signal is simply converted into the digital signal and the plurality of sampling points included in the cross-correlation signal are selected, the maximum sampling point may be estimated based on the plurality of sampling points and the distance to the object may be obtained using a time of a sampling point having the intensity of the maximum sampling point. When the distance is determined using the maximum sampling point without using the digital signal of range diversity, the distance accuracy may be improved.

The detection object device according to an example embodiment of the present disclosure may be applied to various electronic devices for detecting the distance to the object or obtaining a 3D image.

Figure 16:
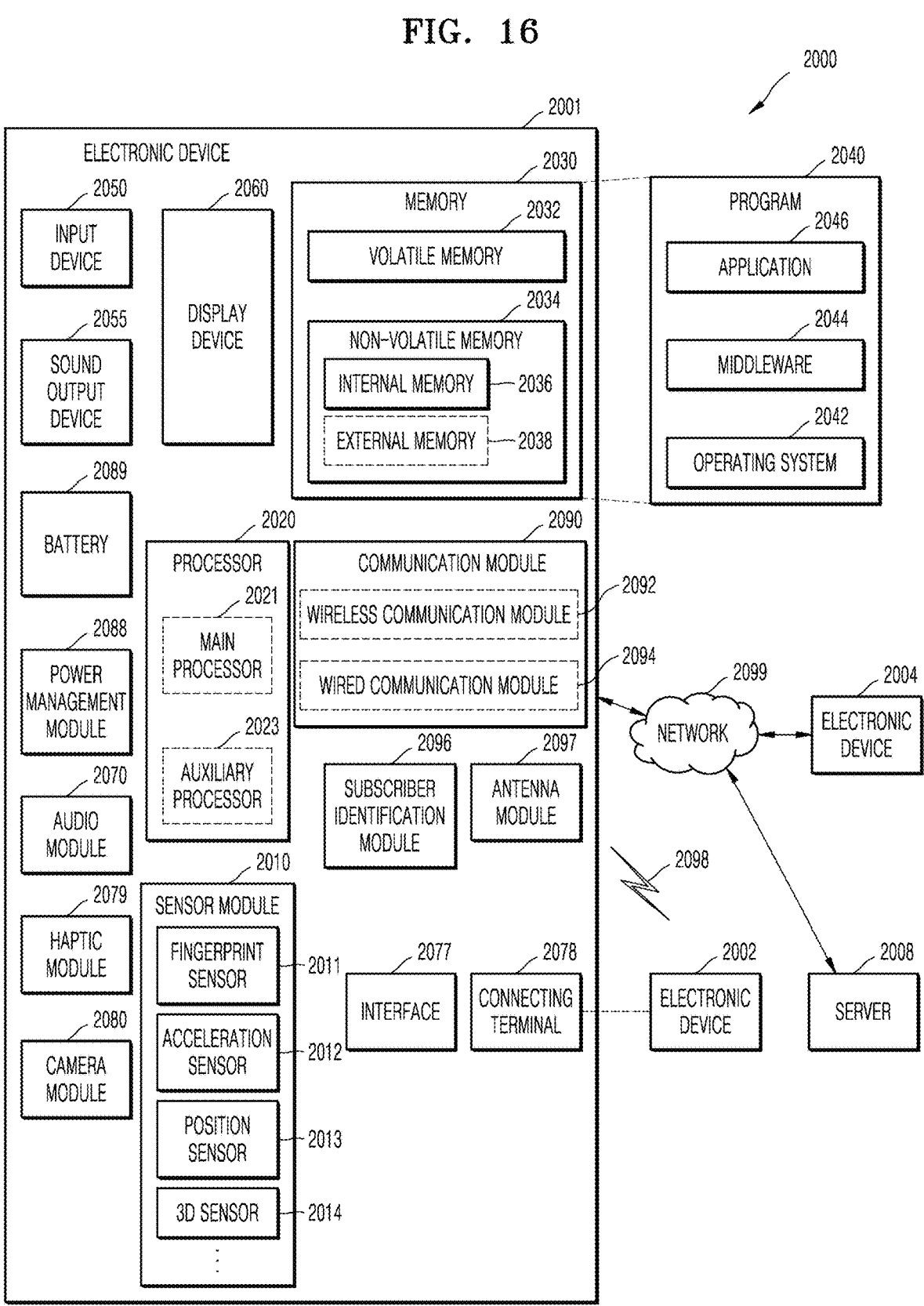
FIG. 16 is a block diagram illustrating a schematic structure of an electronic device, according to an example embodiment of the present disclosure.

FIG. 16 is a block diagram illustrating a schematic structure of an electronic device, according to an example embodiment of the present disclosure.

Referring to FIG. 16, the electronic device 2001 in a network environment 2000 may communicate with another electronic device 2002 via a first network 2098 (e.g., a short-range wireless communication network, etc.), or another electronic device 2004 or a server 2008 via a second network 2099 (e.g., a long-range wireless communication network, etc.). The electronic device 2001 may communicate with the electronic device 2004 via the server 2008. The electronic device 2001 may include a processor 2020, memory 2030, an input device 2050, a sound output device 2055, a display device 2060, an audio module 2070, a sensor module 2010, an interface 2077, a haptic module 2079, a camera module 2080, a power management module 2088, a battery 2089, a communication module 2090, a subscriber identification module 2096, and/or an antenna module 2097. Some (e.g., the display device 2060, etc.) of the components may be omitted from the electronic device 2001, or other components may be added to the electronic device 2201. Some of the components may be implemented as a single integrated circuitry. For example, a fingerprint sensor 2011, an iris sensor, an illuminance sensor, etc., of the sensor module 2010 may be implemented as embedded in the display device 2060 (e.g., a display, etc.).

The processor 2020 may execute software (e.g., a program 2040, etc.) to control one component or a plurality of different components (e.g., a hardware or software component, etc.) of the electronic device 2001 coupled with the processor 2020, and may perform various data processing or computation. As a part of the data processing or computation, the processor 2020 may load a command or data received from another component (e.g., the sensor module 2010, the communication module 2090, etc.) in volatile memory 2032, process the command and/or the data stored in the volatile memory 2032, and store resulting data in non-volatile memory 2034. The processor 2020 may include a main processor 2021 (e.g., a central processing unit, an application processor, etc.), and an auxiliary processor 2023 (e.g., a graphics processing unit, an image signal processor, a sensor hub processor, a communication processor, etc.) that is operable independently from, or in conjunction with, the main processor 2221. The auxiliary processor 2023 may use less power than the main processor 2021 and perform a specialized function.

The auxiliary processor 2023 may control functions and/ or states related to some components (e.g., the display device 2060, the sensor module 2010, the communication module 2090, etc.) among the components of the electronic device 2001, instead of the main processor 2021 while the main processor 2021 is in an inactive (e.g., sleep) state, or together with the main processor 2021 while the main processor 2021 is in an active (e.g., application execution) state. The auxiliary processor 2023 (e.g., an image signal processor, a communication processor, etc.) may be implemented as part of another component (e.g., the camera module 2080, the communication module 2090, etc.) functionally related thereto.

The memory 2030 may store various data needed by a component (e.g., the processor 2020, the sensor module 2076, etc.) of the electronic device 2001. The various data may include, for example, software (e.g., the program 2040, etc.) and input data and/or output data for a command related thereto. The memory 2030 may include the volatile memory 2032 and/or the non-volatile memory 2034.

The program 2040 may be stored in the memory 2030 as software, and may include, for example, an operating system 2042, middleware 2044, and/or an application 2046.

The input device 2050 may receive a command and/or data to be used by other component (e.g., the processor 2020, etc.) of the electronic device 2001, from the outside (e.g., a user, etc.) of the electronic device 2001. The input device 2050 may include a microphone, a mouse, a keyboard, and/or a digital pen (e.g., a stylus pen, etc.).

The sound output device 2055 may output sound signals to the outside of the electronic device 2001. The sound output device 2055 may include a speaker and/or a receiver. The speaker may be used for general purposes, such as playing multimedia or playing record, and the receiver may be used for an incoming calls. The receiver may be coupled as a part of the speaker or may be implemented as an independent separate device.

The display device 2060 may visually provide information to the outside of the electronic device 2001. The display device 2060 may include a display, a hologram device, or a projector and control circuitry to control a corresponding one of the display, hologram device, and projector. The display device 2060 may include touch circuitry adapted to detect a touch, and/or sensor circuitry (e.g., a pressure sensor, etc.) adapted to measure the intensity of force incurred by the touch.

The audio module 2070 may convert a sound into an electrical signal and vice versa. The audio module 2070 may obtain the sound via the input device 2050, or output the sound via the sound output device 2055 and/or a speaker and/or a headphone of another electronic device (e.g., the electronic device 2002, etc.) directly (e.g., wiredly) or wirelessly coupled with the electronic device 2001.

The sensor module 2010 may detect an operational state (e.g., power, temperature, etc.) of the electronic device 2001 or an environmental state (e.g., a state of a user, etc.) external to the electronic device 101, and then generate an electrical signal and/or data value corresponding to the detected state. The sensor module 2010 may include the fingerprint sensor 2011, an acceleration sensor 2012, a position sensor 2013, a 3D sensor 2014, etc., and also include an iris sensor, a gyro sensor, an atmospheric pressure sensor, a magnetic sensor, a grip sensor, a proximity sensor, a color sensor, an infrared (IR) sensor, a bio sensor, a temperature sensor, a humidity sensor, and/or an illuminance sensor.

The 3D sensor 2014 may sense shape, movement, etc. of the object by radiating light to the object and analyzing the light reflected from the object, and may include the object detection device 100 according to the above-described embodiment of the present disclosure.

The interface 2077 may support one or more specified protocols to be used for the electronic device 2001 to be coupled with another electronic device (e.g., the electronic device 2002, etc.) directly or wirelessly. The interface 2077 may include a high-definition multimedia interface (HDMI), a universal serial bus (USB) interface, a secure digital (SD) card interface, and/or an audio interface.

A connecting terminal 2078 may include a connector via which the electronic device 2001 may be physically connected with another electronic device (e.g., the electronic device 2002, etc.). The connecting terminal 2078 may include, for example, a HDMI connector, a USB connector, a SD card connector, and/or an audio connector (e.g., a headphone connector, etc.).

The haptic module 2079 may convert an electrical signal into a mechanical stimulus (e.g., a vibration, motion, etc.) or electrical stimulus which may be recognized by a user via his tactile sensation or kinesthetic sensation. The haptic module 2079 may include a motor, a piezoelectric element, and/or an electric stimulator.

The camera module 2080 may capture a still image or moving images. The camera module 2080 may include a lens assembly including one or more lenses, image sensors, image signal processors, and/or flashes. The lens assembly included in the camera module 2080 may collect light emitted from an object whose image is to be taken.

The power management module 2088 may manage power supplied to the electronic device 2001. The power management module 2088 may be implemented as a part of a power management integrated circuit (PMIC).

The battery 2089 may supply power to a component of the electronic device 2001. The battery 2089 may include a primary cell which is not rechargeable, a secondary cell which is rechargeable, and/or a fuel cell.

The communication module 2090 may support establishing a direct (e.g., wired) communication channel and/or a wireless communication channel between the electronic device 2001 and another electronic device (e.g., the electronic device 2002, the electronic device 2004, the server 2008, etc.) and performing communication via the established communication channel. The communication module 2090 may include one or more communication processors that are operable independently from the processor 2020 (e.g., the application processor, etc.) and supports a direct communication and/or a wireless communication. The communication module 2090 may include a wireless communication module 2092 (e.g., a cellular communication module, a short-range wireless communication module, a global navigation satellite system (GNSS) communication module, etc.) and/or a wired communication module 2094 (e.g., a local area network (LAN) communication module, a power line communication module, etc.). A corresponding one of these communication modules may communicate with the external electronic device via the first network 2098 (e.g., a short-range communication network, such as Bluetooth™, Wireless-Fidelity (Wi-Fi) direct, or infrared data association (IrDA)) or the second network 2099 (e.g., a long-range communication network, such as a cellular network, the Internet, or a computer network (e.g., LAN, wide area network (WAN), etc.). These various types of communication modules may be implemented as a single component (e.g., a single chip, etc.), or may be implemented as multi components (e.g., multi chips) separate from each other. The wireless communication module 2092 may identify and authenticate the electronic device 2001 in a communication network, such as the first network 2098 and/or the second network 2099, using subscriber information (e.g., international mobile subscriber identity (IMSI), etc.) stored in the subscriber identification module 2096.

The antenna module 2097 may transmit or receive a signal and/or power to or from the outside (e.g., another electronic device, etc.). The antenna may include a radiator including a conductive pattern formed on a substrate (e.g., a printed circuit board (PCB), etc.). The antenna module 2097 may include one antenna or a plurality of antennas. When the plurality of antennas are included, an antenna that is appropriate for a communication scheme used in a communication network such as the first network 2098 and/or the second network 2099 may be selected by the communication module 2090 from among the plurality of antennas. The signal and/or the power may then be transmitted or received between the communication module 2090 and another electronic device via the selected antenna. A part (e.g., a radio frequency integrated circuit (RFIC), etc. other than an antenna may be included as a part of the antenna module 2097.

Some of the above-described components may be coupled mutually and communicate signals (e.g., commands, data, etc.) therebetween via an inter-peripheral communication scheme (e.g., a bus, general purpose input and output (GPIO), a serial peripheral interface (SPI), mobile industry processor interface (MIPI), etc.).

Commands or data may be transmitted or received between the electronic device 2001 and the external electronic device 2004 via the server 2008 coupled with the second network 2099. The other electronic devices 2002 and 2004 may be a device of a same type as, or a different type, from the electronic device 2001. All or some of operations to be executed at the electronic device 2001 may be executed at one or more of the other electronic devices 2002, 2004, and 2008. For example, when the electronic device 2001 performs a function or a service, the electronic device 2201, instead of executing the function or the service, may request the one or more other electronic devices to perform the entire function or service or a part thereof. One or more other electronic devices receiving a request may perform an additional function or an additional service related to the request, and transfer an outcome of the performing to the electronic device 2001. To that end, a cloud computing, distributed computing, and/or client-server computing technology may be used, for example.

Figure 17:
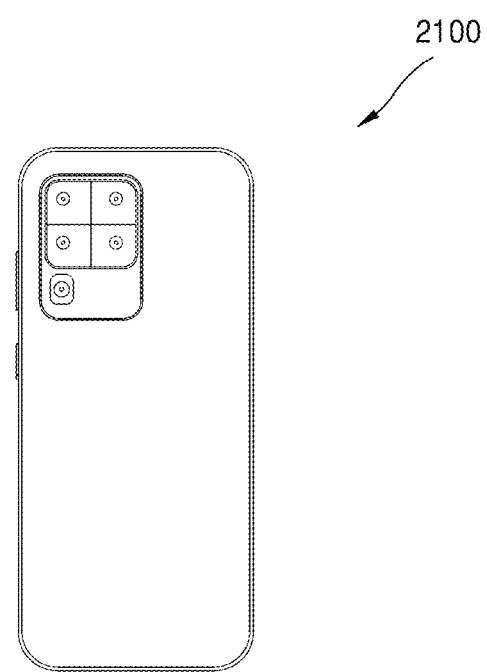
FIGS. 17 through 23 illustrate various examples of an electronic device including an object detection device according to example embodiments of the present disclosure.
Figure 18:
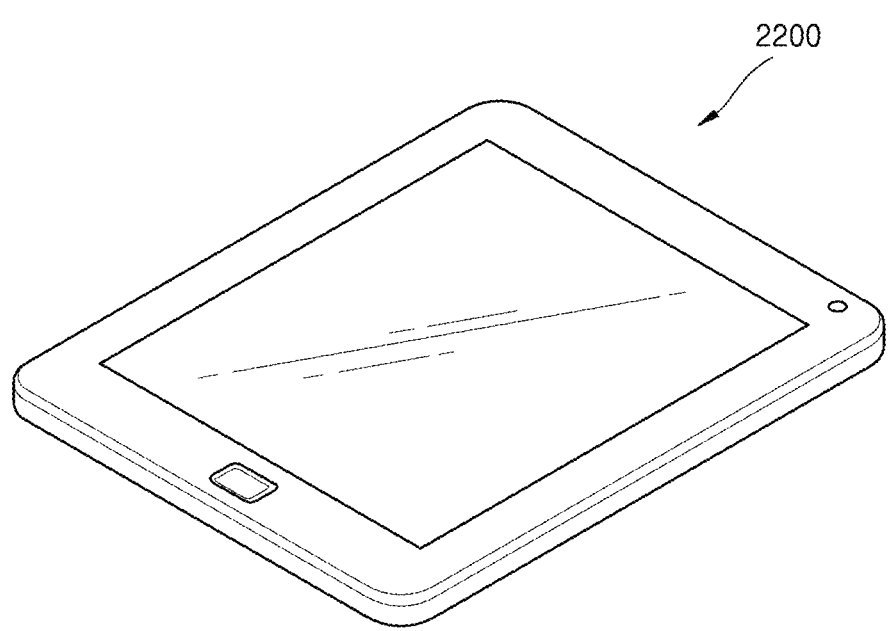
Figure 19:
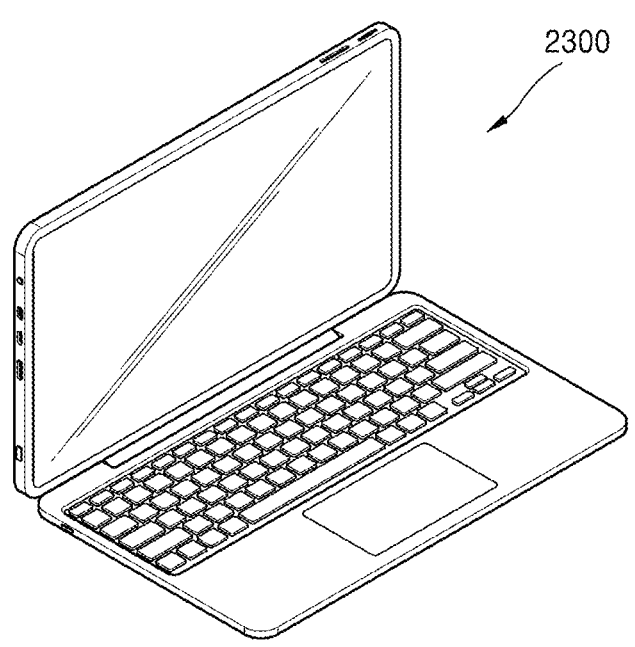

The object detection device 100 according to the embodiments of the present disclosure may be applied to a mobile phone or smart phone 2100 shown in FIG. 17, a tablet or smart tablet 2200 shown in FIG. 18, a laptop 2300 shown in FIG. 1, etc. For example, the smartphone 2100 or the smart tablet 2200 may extract depth information of subjects in an image by using the object detection device 100 that is an object 3D sensor, adjust out-focusing of the image, or automatically identify the subjects in the image.

Figure 20:
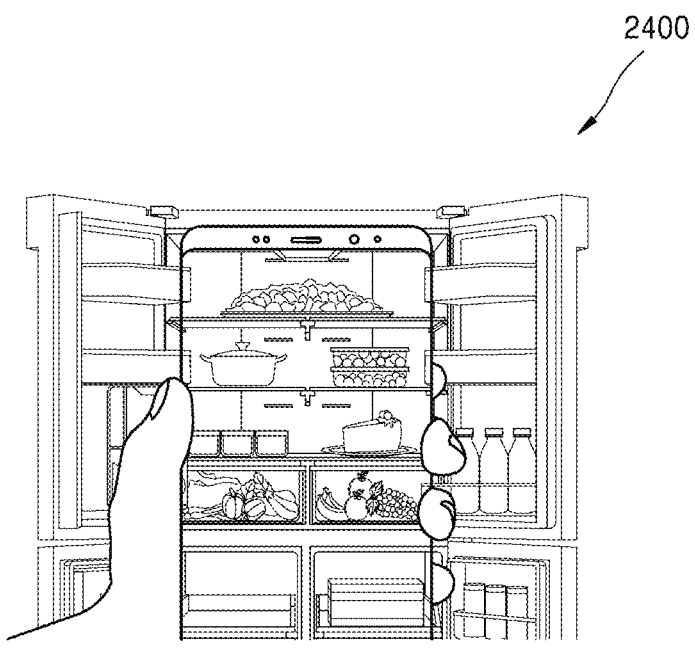
Figure 21:
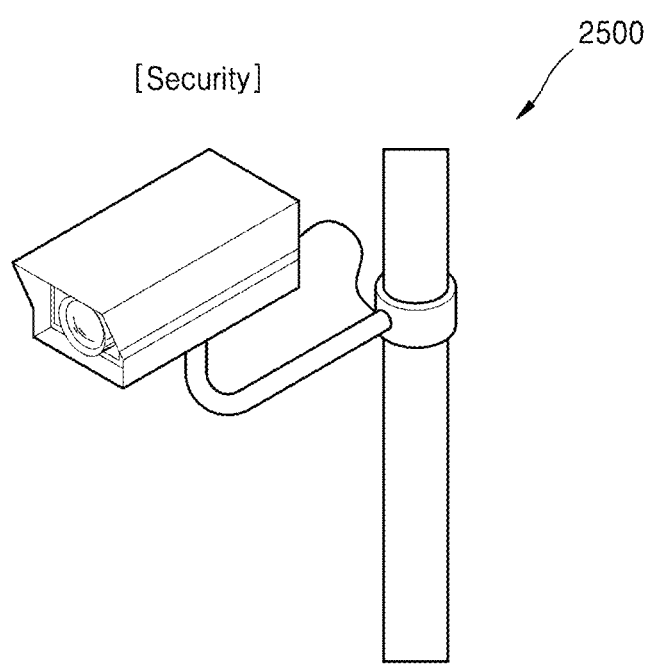
Figure 22:
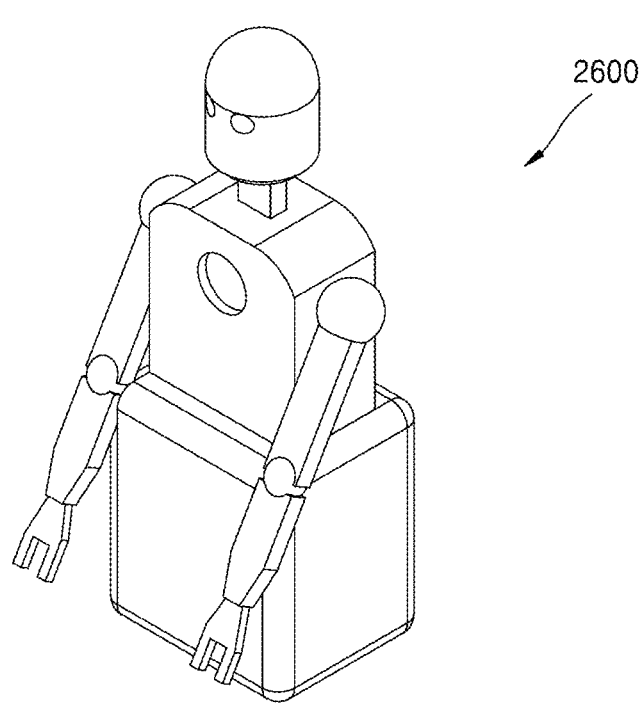

The object detection device 100 may also be applied to a smart refrigerator 2400 shown in FIG. 20, a security camera 2500 shown in FIG. 21, a robot 2600 shown in FIG. 22, etc. For example, the smart refrigerator 2400 may automatically recognize food in the refrigerator using an image sensor, and inform a user of the presence of specific food, the type of incoming or outgoing food, etc., through the smartphone. A security camera 2500 may make it possible to recognize an object or people in the image even in a dark environment. A robot 2600 may provide a 3D image by being put into a disaster or industrial site that is not directly accessible by humans.

Figure 23:
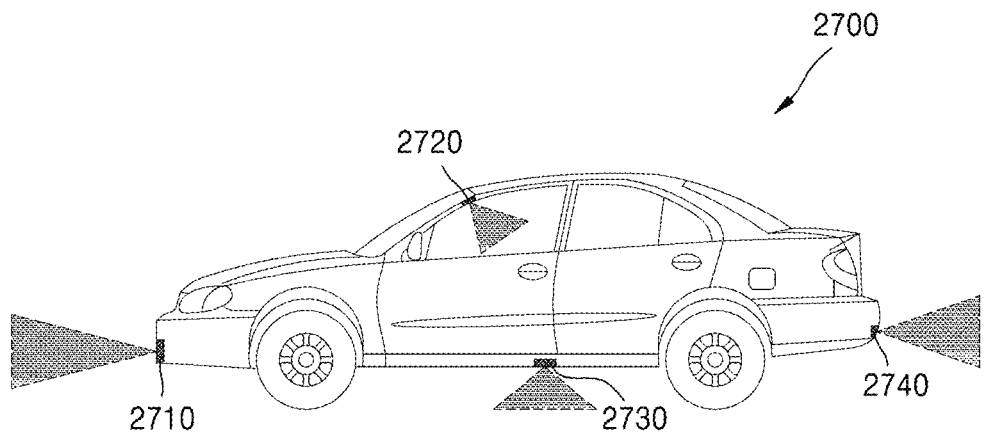

In addition, the object detection device 100, which is a 3D sensor, may be applied to a vehicle 2700 as illustrated in FIG. 23. The vehicle 2700 may include a plurality of object detection devices (2710, 2720, 2730, and 2740) disposed at various locations. The vehicle 2700 may use the plurality of object detection devices (2710, 2720, 2730, and 2740) to provide a driver with various information about the interior or surroundings of the vehicle 2700, and automatically recognize an object or people in the image and provide information necessary for autonomous driving.

Meanwhile, an operating method of the above-described object detecting device 100 may be recorded in a computer-readable recording medium in which one or more programs including instructions for executing the operating method are recorded. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM), flash memory, etc. Examples of the program instructions include a machine language code created by a complier and a high-level language code executable by a computer using an interpreter.

The disclosed object detection device and the operating method thereof may increase distance accuracy with respect to an object by using a digital signal of range diversity.

The disclosed object detection device and the operating method thereof may determine the maximum sampling point from the cross-correlation signal to determine the distance to the object, thereby improving the distance resolution.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An object detection device comprising:
a detector configured to detect infrared light reflected from an object and output an electrical signal in an analog domain corresponding to the infrared light, as a received signal;
a converter configured to perform analog-to-digital conversion on the received signal;
a splitter provided between the detector and the converter, and configured to split the received signal into a plurality of sub received signals;
a plurality of signal lines provided between the splitter and the converter, the plurality of signal lines comprising:
    a non-delay line configured to send a first sub received signal from among the plurality of sub received signals to the converter; and
    one or more time-delay lines configured to time-delay sub received signals other than the first sub received signal, from among the plurality of sub received signals, and send the time-delayed sub received signals to the converter, wherein the converter is further configured to convert the first sub received signal into a digital signal and convert the time-delayed sub received signals into one or more time-delayed digital signals; and
a processor configured to:
    generate a plurality of cross-correlation signals, the plurality of cross-correlation signals comprising a first cross-correlation signal between each of the digital signal and a transmission signal corresponding to the infrared light, and second cross-correlation signals respectively between the one or more time-delayed digital signals and the transmission signal corresponding to the infrared light;
    estimate a plurality of maximum sampling points of the plurality of cross-correlation signals, respectively, based on a predetermined number of a plurality of sampling points extracted from each of the plurality of cross-correlation signals at a sampling rate of the converter; and
    determine a distance to the object based on the plurality of maximum sampling points,
wherein a pulse width of the infrared light, a pulse width of the received signal, and a pulse width of the transmission signal are the same as one another, and a time delay of the one or more time-delayed digital signals is less than the pulse width of the received signal.

2. The object detection device of claim 1, wherein the converter comprises an analog-to-digital converter (ADC).

3. The object detection device of claim 1, wherein a time delay of the time-delayed sub received signals is less than a sampling period of the converter.

4. The object detection device of claim 1, wherein the time-delayed sub received signals are time-delayed by a same amount of time, and
the time-delayed sub received signals are time-delayed with respect to the first sub received signal by ½ of a sampling period of the converter.

5. The object detection device of claim 1, wherein the time-delayed sub received signals are time-delayed by (n−1) different times, in which n equals to a number of the plurality of signal lines, and
a time difference between neighboring time-delayed sub received signals among the time-delayed sub received signals that are time-delayed by (n−1) different times is equal to 1/n of a sampling period of the converter.

6. The object detection device of claim 1, wherein a sampling period of the converter is less than ½ of the pulse width of the received signal.

7. The object detection device of claim 1, wherein the splitter is further configured to split the received signal into the plurality of sub received signals having a same intensity.

8. The object detection device of claim 1, wherein a number of the plurality of sub received signals is equal to a number of the plurality of signal lines.

9. The object detection device of claim 1, wherein the processor is further configured to determine a plurality of estimated distances to the object based on the plurality of maximum sampling points and determine an average of the plurality of estimated distances as the distance to the object.

10. The object detection device of claim 1, wherein the processor is further configured to determine an average sampling point from the plurality of maximum sampling points and determine the distance to the object based on the average sampling point.

11. The object detection device of claim 10, wherein the processor is further configured to apply a quadratic function to the plurality of sampling points of at least one cross-correlation signal among the plurality of cross-correlation signals, to determine a maximum sampling point of the at least one cross-correlation signal, among the plurality of maximum sampling points.

12. The object detection device of claim 11, wherein a number of the plurality of sampling points is greater than or equal to 3.

13. The object detection device of claim 11, wherein the plurality of sampling points comprises a first sampling point having a maximum absolute value in the at least one cross-correlation signal, a second sampling point at a time before m sampling periods from a time corresponding to the first sampling point, and a third sampling point at a time after the m sampling periods from the time corresponding to the first sampling point, in which m is a natural number greater than or equal to 1.

14. The object detection device of claim 1, wherein the processor is further configured to generate a point cloud based on the distance to the object, and obtain a three-dimensional (3D) image regarding the object based on the generated point cloud.

* * * * *